US007093925B2

(12) United States Patent
Vanhooydonck

(10) Patent No.: US 7,093,925 B2
(45) Date of Patent: Aug. 22, 2006

(54) METHOD AND DEVICE FOR PRINTING WITH A UNIFORM PRINTING MEDIUM TRANSPORT DISTANCE

(75) Inventor: Rudi Vanhooydonck, Zwijndrecht (BE)

(73) Assignee: Agfa-Gevaert N.V., Mortsel (BE)

( * ) Notice: Subject to any disclaimer, the term of this patent is extended or adjusted under 35 U.S.C. 154(b) by 285 days.

(21) Appl. No.: 10/850,234

(22) Filed: May 20, 2004

(65) Prior Publication Data

US 2004/0233249 A1 Nov. 25, 2004

Related U.S. Application Data

(60) Provisional application No. 60/477,524, filed on Jun. 11, 2003.

(30) Foreign Application Priority Data

May 22, 2003 (EP) .................................. 03101462

(51) Int. Cl.
B41J 2/145 (2006.01)
(52) U.S. Cl. ...................................................... 347/41
(58) Field of Classification Search .................... 347/41
See application file for complete search history.

(56) References Cited

U.S. PATENT DOCUMENTS 4,198,642 A 4/1980 Gamblin
4,967,203 A 10/1990 Doan et al.
6,046,819 A * 4/2000 Yoshida ....................... 358/1.8
6,190,001 B1 * 2/2001 Saruta ............................ 347/41

FOREIGN PATENT DOCUMENTS

| EP | 0 665 114 A2 | 8/1995 |
| EP | 0 686 507 A2 | 12/1995 |
| EP | 0 760 289 A2 | 3/1997 |
| EP | 1 014 299 A2 | 6/2000 |
| EP | 03 10 1462 | 9/2003 |

* cited by examiner

Primary Examiner—K. Feggins
Assistant Examiner—Rene Garcia, Jr.
(74) Attorney, Agent, or Firm—Robert A. Sabourin; John A. Merecki

(57) ABSTRACT

A printing method and apparatus is disclosed for printing an image on a printing medium by means of a printing head having a first number n of marking elements, the method includes printing the image as a set of N sub-images, N being a number C of colours used for printing multiplied by a number I of interlacing steps and multiplied by a number P of mutually interstitial printing steps (N=C*I*P), where the number I of interlacing steps is greater than 1. Each interlacing step generates an interlaced sub-image, a swath of an interlaced sub-image being printed during a printing pass. There is at least one linear relative movement between the printing medium and the printing head over a uniform transport distance TD in a slow scan direction between the printing of two subsequently printed interlaced sub-images. The transport distance TD is uniform for all linear relative movements and printing is carried out with a subset of the n marking elements, the subset of marking elements being changed after I printing passes.

11 Claims, 10 Drawing Sheets

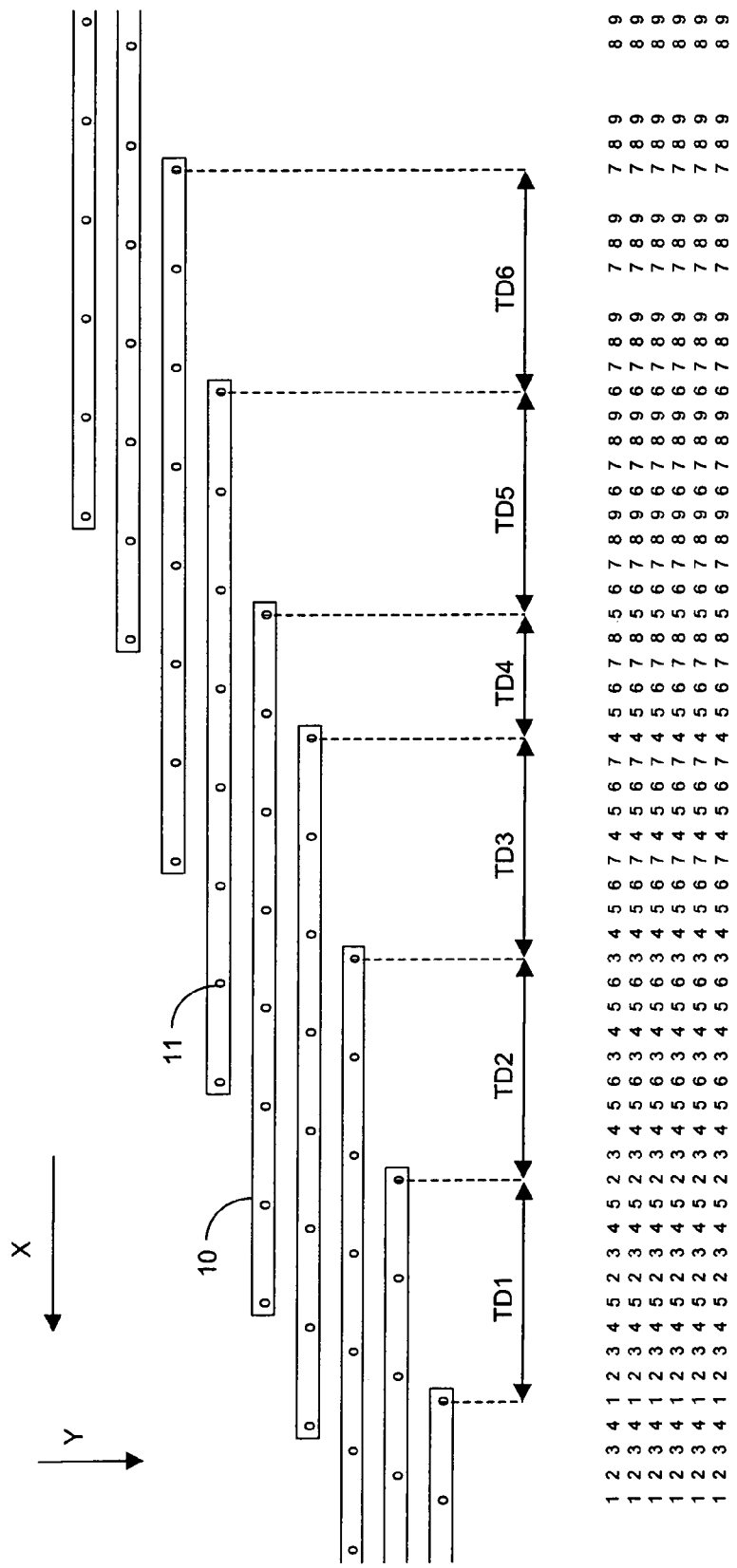

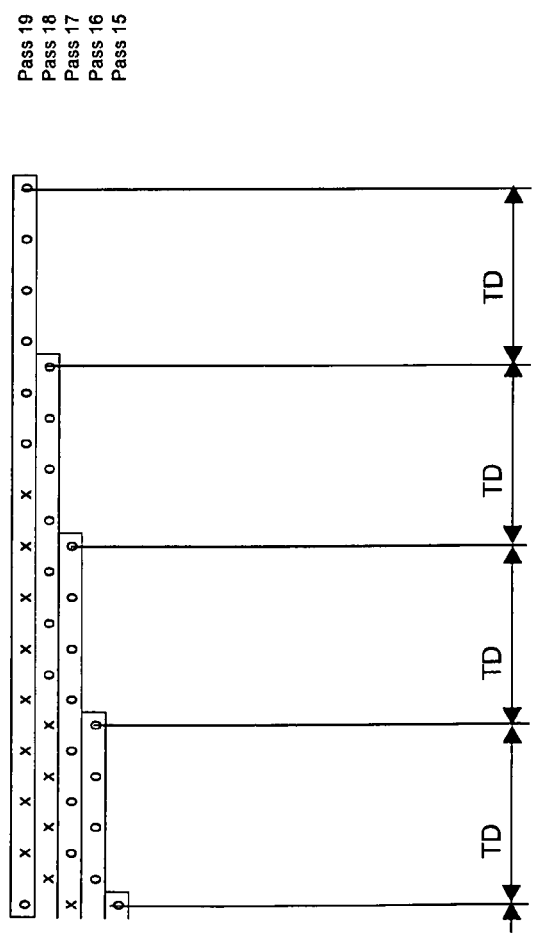
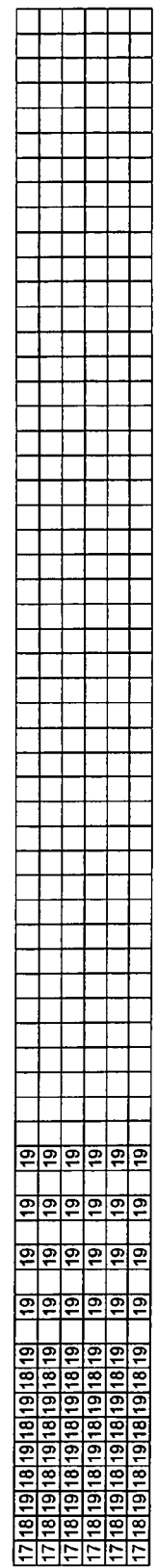
Fig. 2C

METHOD AND DEVICE FOR PRINTING WITH A UNIFORM PRINTING MEDIUM TRANSPORT DISTANCE

The application claims the benefit of U.S. Provisional Application No. 60/477,524 filed on Jun. 11, 2003.

FIELD OF THE INVENTION

The present invention relates to methods and apparatus for printing, such as ink jet or thermal transfer printing, especially non-contact printing as well as controllers and control methods for such apparatus.

BACKGROUND OF THE INVENTION

Printing is one of the most popular ways of conveying information to members of the general public. Digital printing using dot matrix printers allows rapid printing of text and graphics stored on computing devices such as personal computers. These printing methods allow rapid conversion of ideas and concepts to printed product at an economic price without time consuming and specialised production of intermediate printing plates such as lithographic plates. The development of digital printing methods has made printing an economic reality for the average person even in the home environment.

Conventional methods of dot matrix printing often involve the use of a printing head, e.g. an ink jet printing head, with a plurality of marking elements, e.g. ink jet nozzles. The marking elements transfer a marking material, e.g. ink or resin, from the printing head to a printing medium, e.g. paper or plastic. The printing may be monochrome, e.g. black, or multi-coloured, e.g. full colour printing using a CMY (cyan, magenta, yellow, black=a process black made up of a combination of C, M, Y), a CMYK (cyan, magenta, yellow, black), or a specialised colour scheme, (e.g. CMYK plus one or more additional spot or specialised colours). To print a printing medium such as paper or plastic, the marking elements are used or "fired" in a specific order while the printing medium is moved relative to the printing head. Each time a marking element is fired, marking material, e.g. ink, is transferred to the printing medium by a method depending on the printing technology used. Typically, in one form of printer, the printing head will be moved relative to the printing medium to produce a so-called raster line which extends in a first direction, e.g. across a page. The first direction is sometimes called the "fast scan" direction. A raster line comprises a series of dots delivered onto the printing medium by the marking elements of the printing head. The printing medium is moved over a transport distance, usually intermittently, in a second direction perpendicular to the first direction. The second direction is often called the slow scan direction.

The combination of printing raster lines and moving the printing medium relative to the printing head results in a series of parallel raster lines which are usually closely spaced. Seen from a distance, the human eye perceives a complete image and does not resolve the image into individual dots provided these dots are close enough together. Closely spaced dots of different colours are not distinguishable individually but give the impression of colours determined by the amount or intensity of the three colours cyan, magenta and yellow which have been applied.

In order to improve the veracity of printing, e.g. of a straight line, it is preferred if the distance between dots of the dot matrix is small, that is the printing has a high resolution. Although it cannot be said that high resolution always means good printing, it is true that a minimum resolution is necessary for high quality printing. A small dot spacing in the slow scan direction means a small distance between marker elements on the printing head, whereas regularly spaced dots at a small distance in the fast scan direction places constraints on the quality of the drives used to move the printing head relative to the printing medium in the fast scan direction.

Generally, there is a mechanism for positioning a marker element in a proper location over the printing medium before it is fired. Usually, such a drive mechanism is controlled by a microprocessor, a programmable digital device such as a PAL, a PLA, a FPGA or similar although the skilled person will appreciate that anything controlled by software can also be controlled by dedicated hardware and that software is only one implementation strategy.

One general problem of dot matrix printing is the formation of artefacts caused by the digital nature of the image representation and the use of equally spaced dots. Certain artefacts such as Moiré patterns may be generated due to the fact that the printing attempts to portray a continuous image by a matrix or pattern of (almost) equally spaced dots. One source of artefacts can be errors in the placing of dots caused by a variety of manufacturing defects such as is the location of the marker elements in the printing head or systematic errors in the movement of the printing head relative to the printing medium. In particular, if one marking element is misplaced or its firing direction deviates from the intended direction, the resulting printing will show a defect which can run throughout the printing. A variation in drop velocity will also cause artefacts when the printing head is moving as time of flight of the drop will vary with variation in the velocity. Similarly, a systematic error in the way the printing medium is moved relative to the printing medium may result in defects which may be visible. For example, slip between the drive for the printing medium and the printing medium itself will introduce errors. In fact, any geometrical limitation of the printing system can be a source of errors, e.g. the length of the printing head, the spacing between marking elements, the indexing distance of the printing medium relative to the printing head in the slow scan direction. Such errors may result in "banding" that is the distinct impression that the printing has been applied in a series of bands. The errors involved can be very small—the colour discrimination, resolution and pattern recognition of the human eye are so well developed that it takes remarkably little for errors to become visible.

To alleviate some of these errors it is known to alternate or vary the use of marker elements so as to spread errors throughout the printing so that at least some systematic errors will then be disguised. For example, one method often called "shingling" is known from U.S. Pat. No. 4,967,203 which describes an ink jet printer and method. Each printing location or "pixel" can be printed by four dots, one each for cyan, magenta, yellow and black. Adjacent pixels on a raster line are not printed by the same marking element in the printing head. Instead, every other pixel is printed using the same marking element. In the known system the pixels are printed in a checkerboard pattern, that is, as the printing head traverses in the fast scan direction a marking element is able to print at only every other pixel location. Thus, any marking element which prints consistently in error does not result in a line of pixels in the slow scan direction each of which has the same error. However the result is that only 50% of the marking elements in the printing head can print at any one time. In fact, in practice, each marking element prints at a location which deviates a certain amount from the correct position for this marking element. The use of shingling can distribute these errors through the printing. It is generally accepted that shingling is an inefficient method of printing as not all the marking elements are used continuously and several passes are necessary.

As said above, this kind of printing has been called "shingling". However, printing dictionaries refer to "shingling" as a method to compensate for creep in book-making. The inventors are not aware of any industrially accepted term for the printing method wherein no adjacent pixels on a raster line are printed by one and the same marking element. Therefore, from here on and in what follows, the terms "mutually interstitial printing" or "interstitial mutually interspersed printing" are used. It is meant by these terms that an image to be printed is split up in a set of sub-images, each sub-image comprising printed parts and spaces, and wherein at least a part of the spaces in one printed sub-image form a location for the printed parts of another sub-image, and vice versa.

Another method of printing is known as "interlacing", e.g. as described in U.S. Pat. No. 4,198,642. The purpose of this type of printing is to increase the resolution of the printing device. That is, although the spacing between marking elements on the printing head along the slow scan direction is a certain distance x, the distance between printed dots in the slow scan direction is less than this distance. The relative movement between the printing medium and the printing head is indexed by a distance given by the distance x divided by an integer.

For example, as illustrated in FIG. 1, a first part of a printing head 10 (e.g. the first quarter) prints first every so many columns, e.g. every fourth column. Then the printing head 10 is transported by one pixel pitch+($k_1$*marking element pitch), it is to be noted that $k_1$ is an integer which may be zero. Then in the next pass the printing head 10 prints again every so many columns, e.g. every fourth column beginning with the second one, then the printing head 10 is transported one pixel pitch+($k_2$*marking element pitch), ($k_2$ is an integer which may be zero). This procedure is repeated a number of times, e.g. a third time and a fourth time, after which the printing head 10 can be displaced by the remainder of the head length. The value of k (generally, $k_i$) can be chosen freely.

If an image is printed using different sub-images with interlacing, often at least two different transport distances are necessary. In FIG. 1, 4 times interlacing is illustrated, i.e. the pixel pitch is $¼^{th}$ of the marking element pitch. It can be seen from FIG. 1 that, in the example given, the transport distances are as follows:

TD1=1 pixel pitch+2 marking element pitch

TD2=1 pixel pitch+2 marking element pitch

TD3=1 pixel pitch+2 marking element pitch

TD4=1 pixel pitch+1 marking element pitch

TD5=1 pixel pitch+2 marking element pitch

TD6=1 pixel pitch+2 marking element pitch

TD4 is smaller than TD1 to TD3 in order to be able to write at every single pixel position.

For stability reasons, it can be advantageous to use only one physical transport distance.

In EP 01 014 299 a method for performing interlaced printing is described, in which method equal transport distances are used. In the method described, a number of requirements need to be met:
1. The number of sub-scan feeds (printing passes) in one feed cycle (i.e. before one head length is printed) needs to be equal to the marking element pitch k (expressed in pixels) multiplied by the number of mutually interstitial printing steps.
2. The marking element offsets F after the respective sub-scan feeds in one feed cycle assume different values in the range of 0 to (k−1), as many times as there are mutually interstitial printing steps in one feed cycle.
3. The average sub-scan feed amount ($\Sigma L/(k*P)$) is equal to the number of effectively used marking elements $N_{eff}$ ($N_{eff}=N/P$), N being the number of used marking elements of the printing head.

The above conditions can be understood as follows. Since (k−1) raster lines are present between adjoining marking elements in the printing head, the number of sub-scan feeds required in one feed cycle is equal to k so that the (k−1) raster lines are serviced during one feed cycle and that the marking element position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. Therefore, the first condition is required.

If the number of sub-scan feeds in one feed cycle is equal to k, there will be no skipping or overwriting of raster lines to be recorded only when the marking element offsets F after the respective sub-scan feeds in one feed cycle take different values in the range of 0 to (k−1). Therefore, the second condition is required.

When the first and the second conditions are satisfied, each of the N marking elements records k raster lines in one feed cycle. Namely N*k raster lines can be recorded in one feed cycle. When the third condition is satisfied, the marking element position after one feed cycle, that is, after the k sub-scan feeds, is away from the initial position by the N*k raster lines.

Satisfying the above first through third conditions thus prevents skipping or overwriting of raster lines to be recorded in the range of N*k raster lines.

SUMMARY OF THE INVENTION

It is an object of the present invention to provide a method and a device for printing interlaced images without having the numerous requirements as imposed by the prior art.

The above objective is accomplished by a method and device according to the present invention having one and the same transport distance between every two subsequent printing passes.

The present invention provides a dot matrix printing method for printing an image on a printing medium by means of a printing head comprising a first number n of marking elements. The method comprises printing the image as a set of N sub-images, N being a number C of colours used for printing multiplied by a number I of interlacing steps and multiplied by a number P of mutually interstitial printing steps (N=C*I*P). The number C of colours used may be one, for monochromatic printing, or more, e.g. 3 or 4 for colour printing. The number I of interlacing steps is greater than 1, each interlacing step generating an interlaced sub-image. The number P of mutually interstitial printing steps may be one (no mutually interstitial printing) or more. A swath of an interlaced sub-image is printed during a printing pass. There is at least one first linear relative movement between the printing medium and the printing head over a uniform transport distance TD in a slow scan direction between the printing of two subsequently printed swaths of interlaced sub-images, the transport distance TD being uniform for all first linear relative movements. According to the present invention, printing is carried out with a subset of the n marking elements, and the subset of marking elements is changed after a number of printing passes which equals the number I of interlacing steps.

The first number n of marking elements may be arranged in an array, and the subset of marking elements may comprise a second number $n_a$ of successive marking elements. The changing of the subset of marking elements may be obtained by shifting the second number $n_a$ of marking elements in the array over a third number of marking elements. The third number of marking elements may equal 1 marking element. Shifting over more than one marking element is also possible, but has the drawback that much more nozzles are needed for being able to perform the same printing.

The subset of marking elements may furthermore be changed after each printing pass, and not only after I interlacing steps.

According to an embodiment of the present invention, it is possible that only a limited number of marking elements, e.g. a fourth number $n_e$ of marking elements, are activatable for printing, where necessary in accordance with the image to be printed. The fourth number $n_e$ may be given by $n_e=k*I*(P+1)-2$, where I is the number of interlacing steps, P is the number of mutually interstitial printing steps, and k is an integer so that the fourth number $n_e$ is not larger than the first number n.

A method according to the present invention may furthermore comprise shifting back the subset of marking elements over $(I*TD-1)$ or $(n_e-n_a)$ marking elements after $[(I*TD+1)*I]$ or $(n_e-n_a+2)*I$ transport steps.

The second number $n_a$ of marking elements may be a function of the number I of interlacing steps and the number P of mutually interstitial printing steps.

The second number $n_a$ of marking elements may be given by $n_a=k*I*P$, where I is the number of interlacing steps and P is the number of mutually interstitial printing steps, and k is an integer so that $(k*I*(P+1)-2)$, or thus the fourth number $n_e$, is not larger than the first number n.

According to an embodiment of the present invention, a dot matrix printing method for printing an image with a limited size, e.g. a width L not larger than $$\frac{n^2}{4*P} + \frac{n}{2*I*P} + \frac{1}{4*I^2*P} - n$$

is provided, wherein the second number $n_a$ of marking elements is given by $$n_a = int\left[\frac{\frac{(I*n+1)}{2*I} + \sqrt{\frac{n^2}{4} + \frac{n}{2*I} + \frac{1}{4*I^2} - P*n - P*L}}{N}\right]*N,$$

where I is the number of interlacing steps, P is the number of mutually interstitial printing steps and n is the number of marking elements on the printing head.

According to an embodiment of the present invention, a dot matrix printing method may furthermore comprise calculating the second number $n_a$ of marking elements as a first solution $n_a(1)=k*I*P$, and as a second solution $$n_a(2) = int\left[\frac{\frac{(I*n+1)}{2*I} + \sqrt{\frac{n^2}{4} + \frac{n}{2*I} + \frac{1}{4*I^2} - P*n - P*L}}{N}\right]*N$$

and selecting from the first solution $n_a(1)$ and the second solution $n_a(2)$ the one which has the largest value, and using that as the second number $n_a$ of marking elements.

The uniform transport distance TD may be given by $$TD = \frac{n_a}{P*I} - \frac{1}{I},$$

where

I is the number of interlacing steps, P is the number of mutually interstitial printing steps, and $n_a$ is the second number of marking elements.

A method according to the present invention may furthermore comprise a second linear relative movement between the printing medium and the printing head in a fast scan direction perpendicular to the slow scan direction for printing a sub-image.

A plurality of the uniform transport steps may be carried out in between the printing of two subsequently printed swaths of sub-images. This does not necessarily happen between every two subsequently printed swaths of sub-images.

The present invention also provides an apparatus for dot matrix printing an image on a printing medium as a set of N sub-images, N being a number C of colours used for printing multiplied by a number I of interlacing steps and multiplied by a number P of mutually interstitial printing steps ($N=C*I*P$). The number C of colours used may be one, for monochromatic printing, or more, e.g. 3 or 4 for colour printing. The number I of interlacing steps is greater than 1, each interlacing step generating an interlaced sub-image. The number P of mutually interstitial printing steps may be one (no mutually interstitial printing) or more. Each interlacing step generates an interlaced sub-image, and a swath of an interlaced sub-image is printed during a printing pass. An apparatus according to the present invention comprises:
a printing head,
an array of a first number n of equally spaced marking elements on the printing head, the marking elements being spaced apart by a distance "x" in a slow scan direction,
means for generating at least one first linear relative movement between the printing head and the printing medium over a uniform transport distance TD in the slow scan direction, the transport distance TD being uniform for all first linear relative movements,
means for driving a subset of the first number n of marking elements, and means for changing the subset of marking elements after a number of printing passes which equals the number I of interlacing steps.

The subset of marking elements may comprise a second number $n_a$ of successive marking elements, $n_a$ being less than n, wherein the means for changing the subset of marking elements comprises means for shifting the second number $n_a$ of marking elements over a third number of marking elements. The third number of marking elements may equal 1 marking element.

The means for changing the subset of marking elements may comprise means for changing the subset of marking elements after each printing pass.

The apparatus may be adapted so that only a fourth number $n_e$ of marking elements are activatable for printing, where necessary in accordance with the image to be printed. The fourth number $n_e$ may be given by $n_e=k*I*(P+1)-2$, where I is the number of interlacing steps, P is the number of mutually interstitial printing steps, and k is an integer so that the fourth number $n_e$ is not larger than the first number n.

An apparatus according to the present invention may furthermore comprise means for shifting back the subset of marking elements over $(n_e-n_a)$ or thus $(I*TD-1)$ marking elements after $(n_e-n_a+2)*I$ or thus $(I*TD+1)*I$ transport steps.

The second number $n_a$ of marking elements may be given by $n_a=k*I*P$, where I is the number of interlacing steps and P is the number of mutually interstitial printing steps, and k is the integer so that the fourth number $n_e$, or thus $k*I*(P+1)-2$, is not larger than the first number n.

According to another embodiment of the present invention, an apparatus for dot matrix printing an image with limited width L not larger than $$\frac{n^2}{4*P} + \frac{n}{2*I*P} + \frac{1}{4*I^2*P} - n$$

is provided, wherein the second number $n_a$ of marking elements may be given by $$n_a = int\left[\frac{\frac{(I*n+1)}{2*I} + \sqrt{\frac{n^2}{4} + \frac{n}{2*I} + \frac{1}{4*I^2} - P*n - P*L}}{N}\right]*N$$

where I is the number of interlacing steps, P is the number of mutually interstitial printing steps and n is the number of marking elements on the printing head.

An apparatus according to the present invention may furthermore comprise calculation means for calculating the second number $n_a$ of marking elements as a first solution $n_a(1)=k*I*P$, and as a second solution $$n_a(2) = int\left[\frac{\frac{(I*n+1)}{2*I} + \sqrt{\frac{n^2}{4} + \frac{n}{2*I} + \frac{1}{4*I^2} - P*n - P*X}}{N}\right]*N,$$

comparing means for comparing the first solution $n_a(1)$ and the second solution $n_a(2)$ and selecting means for selecting from the first solution $n_a(1)$ and second solution $n_a(2)$ the one which has the largest value, the apparatus being adapted to use the selected solution as the second number $n_a$ of marking elements.

The uniform transport distance TD may be given by $$TD = \frac{n_a}{P*I} - \frac{1}{I}.$$

An apparatus according to the present invention may furthermore comprise means for generating a second linear relative movement between the printing head and the printing medium in a fast scan direction perpendicular to the slow scan direction.

The apparatus may be adapted to carry out a plurality of uniform transport steps in between the printing of two subsequently printed swaths of sub-images.

The marking elements may be ink jet nozzles.

The present invention also provides a computer program product for executing any of the methods according to the present invention as described above when executed on a computing device associated with a printing head.

The present invention also provides a machine readable data storage device for storing the computer program product of the present invention.

The present invention also provides transmission of the computer program product of the present invention over a local or wide area telecommunications network.

The present invention furthermore provides a control unit for a dot matrix printer for printing an image on a printing medium by means of a printing head comprising a set of marking elements. The control unit comprises:

means for controlling printing of the image as a set of N sub-images, N being a number of colours used for printing multiplied by a number I of interlacing steps and multiplied by a number P of mutually interstitial printing steps (N=C*I*P), means for controlling a first linear relative movement between the printing head and the printing medium over a transport distance in a slow scan direction so that the transport distance is uniform for all first linear relative movements, means for controlling selection of a subset of marking elements for printing and for changing the selected subset after printing of I interlaced sub-images.

The number C of colours used may be one, for monochromatic printing, or more, e.g. 3 or 4 for colour printing. The number I of interlacing steps is greater than 1, each interlacing step generating an interlaced sub-image. The number P of mutually interstitial printing steps may be one (no mutually interstitial printing) or more.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference signs quoted below refer to the attached drawings.

BRIEF DESCRIPTION OF THE DRAWINGS

FIG. 1 is an illustration of conventional interlaced printing.

FIG. 2A, FIG. 2B and FIG. 2C are an illustration of a first example of interlaced printing according to an embodiment of the present invention. These 3 drawings can be placed next to each other and together describe 19 passes of interlaced printing.

Figure 2A:
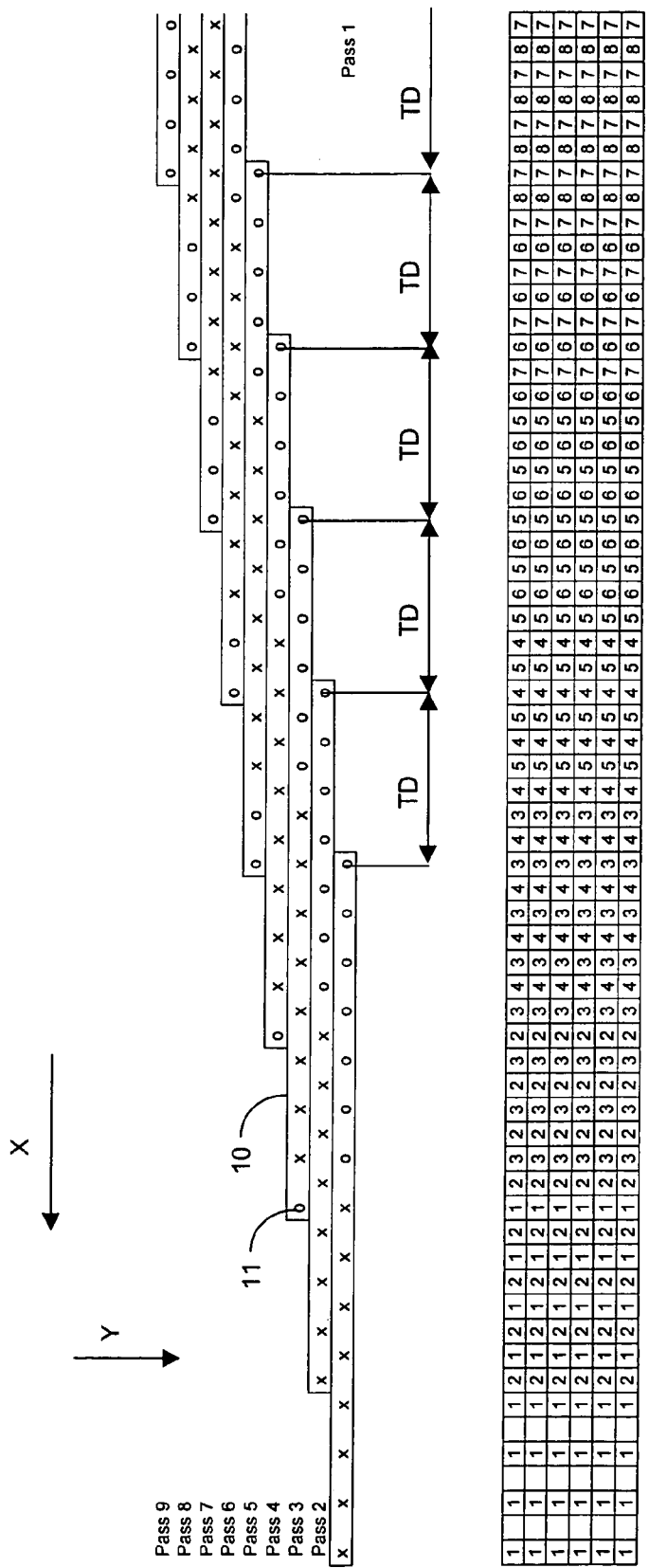

In the different figures, the same reference signs refer to the same or analogous elements.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Various printing methods which may be used with the present invention are described in the book "Principles of non-impact printing", J. L. Johnson, Palatino Press, Irvine, 1998, e.g. thermal transfer printing, thermal dye transfer printing, deflected ink jet printing, ion projection printing, field control printing, impulse ink jet printing, drop-on-demand ink jet printing, continuous ink jet printing.

The term "printing medium" or "printing substrate" should also be given a wide meaning including not only paper, transparent sheets, textiles but also flat plates or curved plates which may be included in or be part of a printing press. In addition the printing may be carried out at room temperature or at elevated temperature, e.g. to print a hot-melt adhesive the printing head may be heated above the melting temperature. Accordingly, the term "ink" should also be interpreted broadly including not only conventional inks but also solid materials such as polymers which may be printed in solution or by lowering their viscosity at high temperatures as well as materials which provide some characteristic to a printed substrate such as information defined by a structure on the surface of the printing substrate, or water repelling characteristics. As solvents both water and organic solvents may be used. Inks as used with the present invention may include a variety of additives such as ant-oxidants, pigments and cross-linking agents.

As shown in FIG. 2A a scanning printing head 10 may have an elongate form having a longitudinal axis. The printing head 10 comprises a plurality of marking elements 11, for example a plurality of ink jetting orifices each arranged in an array.

Generally, the printing head 10 is moved relative to a printing medium (such as paper) in the direction indicated with the arrow "Y" known as the fast scan direction which, in the example given, is perpendicular to the longitudinal axis of the printing head 10. In an alternative embodiment, not shown in the drawings, the printing head may be placed in a slanted position with regard to the fast scan direction, to increase the printing resolution. The printing head 10 may comprise an ink cartridge carried on a movable carriage assembly. By repeatedly firing the array of marking elements 11 and moving in the fast scan direction Y ink drops are deposited on the printing medium in parallel lines across the printing medium in accordance with an image to be printed. Each line of printing from a single marking element 11 is known as a raster line. When the printing head 10 has traversed the printing medium it returns to its starting position and the process begins again. The printing head 10 may print on the way back—i.e. printing a second pass, or the printing head 10 may only print when moving in one direction. The printing medium may be indexed in the slow scan direction X (perpendicular to the fast scan direction Y and, in the example given, parallel to the longitudinal axis of the printing head 10) between passes. The firing of the marking elements 11 is controlled by a control device, e.g. a microprocessor or micro-controller, the firing being in accordance with a digital representation of an image which is processed by the control device. The digital representation of an image may be provided by a graphics software program running on a host computer or by scanning in an image. In this way a complete image is printed.

Within an array of marking elements adjacent marking elements in the slow scan direction have a spacing "np" (nozzle pitch). This is usually constant for an array.

According to the present invention, a printing head 10 having n marking elements may be used. Printing is performed by carrying out a number N of printing passes, the number of printing passes being defined by:

$$N = P * I,\qquad(\text{Eq. 1})$$

I being the number of interlacing passes and P being the number of mutually interstitial printing steps.

The number of interlacing printing passes is expressed as the nozzle pitch np of the marking elements, in dots on the printing medium. If one dot is printed on the printing medium in between every two marking elements of the head, two interlacing passes are to be performed, or, in other word, printing with 50% interlacing is performed. If three dots are printed on the printing medium in between every two marking elements of the head, four interlacing passes are to be performed, or, in other word, printing with 25% interlacing is performed.

The number of mutually interstitial printing passes is the number of printing passes or scans in which all dot positions on a raster line are serviced. If all dot positions on a raster line are serviced in a single pass, the number of mutually interstitial printing passes is one, or, in other words, 100% mutually interstitial printing is performed. If, during one and the same scan, a marking element prints only every second dot on a raster line, the intermediate dots being printed by another marking element during another printing pass, the number of mutually interstitial printing passes is two, or, in other words, 50% mutually interstitial printing is performed. Analogously, if during one and the same scan, a marking element prints every fourth dot on a raster line, the intermediate dots being printed during three other printing steps, the number of mutually interstitial printing passes is four, or, in other words, 25% mutually interstitial printing is performed.

According to an aspect of the present invention, printing is performed, at any moment in time, with a subset of the n marking elements, which subset comprises $n_a$ marking elements; $n_a<n$. This subset is also called the subset of actively used marking elements, i.e. the marking elements which are used during a printing pass. By "actively used" is meant those marking elements which can fire depending upon the image to be printed—it does not mean that they will fire as whether a marking element fires or not depends on the image to be printed. The subset of actively used marking elements is changed, at least after having printing during I printing passes. The number $n_a$ of actively used marking elements is the same for each printing pass, but the physical location of the marking elements on the printing head is different during at least some of the printing passes. The subset of actively used marking elements is preferably shifted over one marking element after a first number of printing passes. This means that after a second number of printing passes, the subset of actively used marking elements reaches the end of the printing head 10, and needs to be shifted back to the beginning of the printing head 10.

It is also possible according to an aspect of the present invention, that from the n marking elements of the printing head, only $n_e$ marking elements are used, $n_e<n$ (in general $n_e \leq n$). In that case, the shifting of the actively used marking elements is not performed up to the end of the printing head 10, i.e. up to a moment in time when all marking elements of the printing head 10 have been activatable at least during one printing pass, but rather up to a moment in time when $n_e$ marking elements of the printing head 10 have been activatable at least during one printing pass. This means that $n-n_e$ marking elements are not used at all, and are thus redundant. After every printing pass, the printing head 10 is moved over a transport distance TD in the slow scan direction X. The transport distance TD is the same every time the printing head 10 is moved in the slow scan direction X.

As said before, after each printing pass, the printing head 10 is moved over a transport distance TD, and after I printing passes, the subset of actively used marking elements is shifted over one marking element. At that moment, the printing head 10 has been moved over a distance I*TD (in nozzle pitch), or thus, in order to be able to shift back $$I*TD-1=n_e-n_a \quad \text{(Eq. 2)}$$

The length of the transport distance TD, in order for it to be so as to shift one nozzle at the time, has to be:

$$TD = \frac{n_a}{I*P} - \frac{1}{I} \quad \text{(Eq. 3)}$$

If Eq. 3 is introduced in Eq. 2, the following is obtained:

$$n_e - n_a + 1 = \frac{n_a}{P} - 1 \quad \text{(Eq. 4)}$$

$$\Rightarrow n_a * \left(\frac{P+1}{P}\right) = n_e + 2$$

$$\Rightarrow n_a = (n_e + 2) * \left(\frac{P}{P+1}\right)$$

To be able to have a constant transport step, it is necessary that $n_a$ is dividable by N, or thus:

$$n_a = k*I*P \quad \text{(Eq. 5)}$$

k being an integer, $n_a<n$.

By combining Eq. 4 and Eq. 5, the following is obtained:

$$(n_e + 2) * \left(\frac{P}{P+1}\right) = k*I*P \quad \text{(Eq. 6)}$$

The number $n_e$ of marking elements which can be effectively used according to an aspect of the present invention can then be calculated as:

$$n_e = k*I*(P+1) - 2 \quad \text{(Eq. 7)}$$

where k is an integer so that $n_e \leq n$. Preferably $n_e$ is as close as possible to n, i.e. k is chosen maximal. If n is larger than $n_e$, then according to the present invention a number of marking elements equal to $n-n_e$ is not used for printing.

During a first printing pass, $n_a$ raster lines are printed with the first $n_a$ marking elements. After the first printing pass, the printing head and the printing medium are moved with respect to each other over a transport distance TD, which is given in Eq. 3. Thereafter, a next printing pass is carried out.

After each printing pass, the printing head and the printing medium are moved with respect to each other over the same transport distance TD.

After a number of printing passes equal to the number of interlacing steps, the $n_a$ actively used marking elements are shifted over one marking element, i.e. if during the first I printing passes the marking elements 1 to $n_a$ are actively used for printing, during the next I printing passes the marking elements 2 to $n_a+1$ are used, and so on.

After a number of printing passes equal to $$(n_e-n_a+1)*I, \quad \text{(Eq. 8)}$$

or thus, by bringing Eq. 2 into Eq. 8, after a number of printing passes equal to $$I^2*TD,$$

a number of transport steps over the transport distance TD are carried out without printing passes in between. This number of "idle" transport steps is equal to I.

After that number of "idle" transport steps, the $n_a$ actively used marking elements are again shifted to the beginning of the printing head, i.e. the actively used marking elements are shifted back over $n_b=n_e-n_a=I*TD-1$ marking elements, and printing can start as in the beginning, with the first $n_a$ marking elements.

A few examples illustrating the principles of the present invention are given in FIGS. 2A–2C, FIG. 3 and FIGS. 4A–4B, and are explained hereinafter.

Figure 2B:
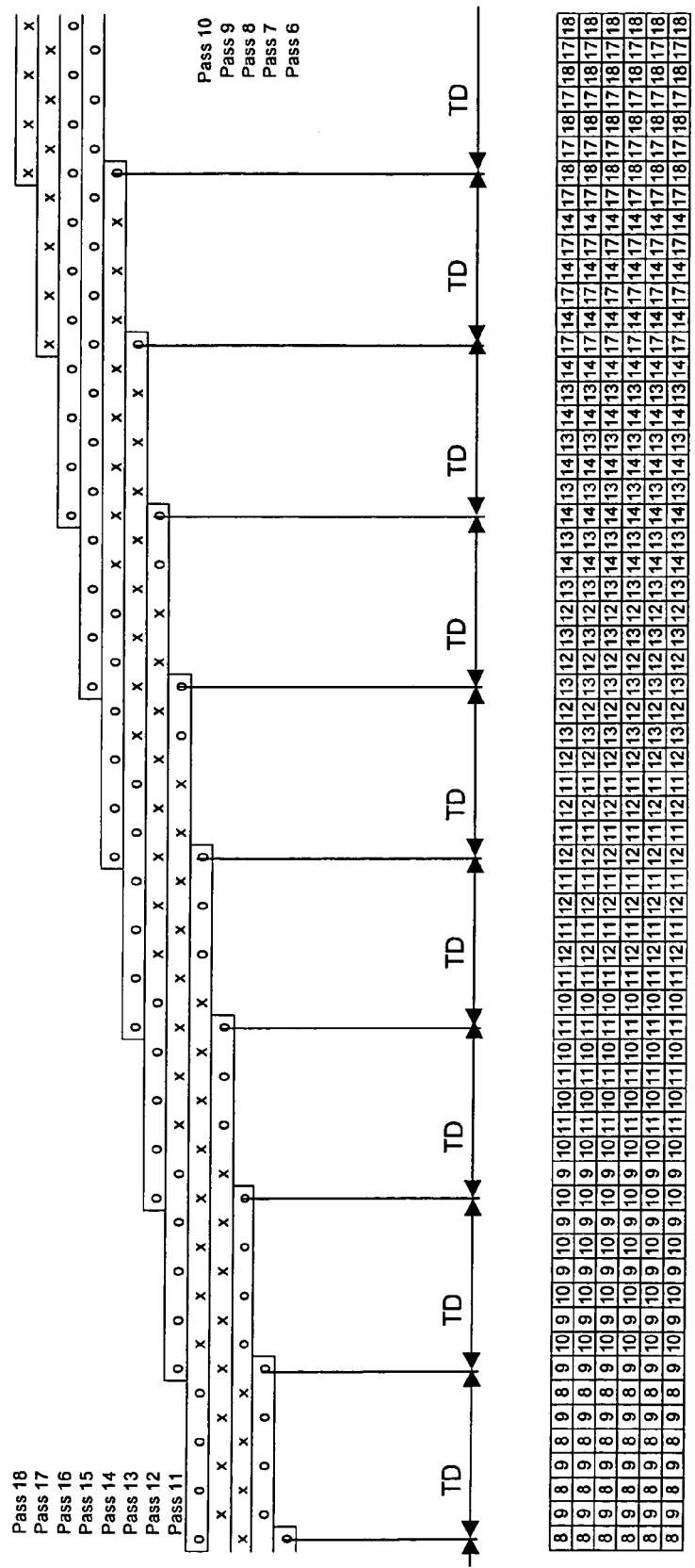

In the first example illustrating certain principles of the present invention, see FIG. 2A to FIG. 2C, a printing head is used which has n=15 marking elements for printing an image on a printing medium by means of I sub-images, I being the number of interlacing steps. The pitch between two marking elements, or nozzle pitch, is two dots, thus the number of interlacing steps I=2. No mutually interstitial printing steps are used, therefore P=1. According to the present invention, it is possible to print the image with a constant transport distance of the printing medium, by leaving some of the n marking elements inactive during each printing step.

The number of marking elements $n_e$ which can effectively be used according to the present invention is:

$$n_e = k*I*(P+1)-2 = k*4-2$$

k-values which may be used are k=1, k=2, k=3 or k=4. The most efficient solution is to use as many marking elements as possible, i.e. k=4, and this in order to print as fast as possible.

Embodiments of the present invention are described for such maximum k-value, but it is not intended to limit the invention to such maximum k-value. Other, lower, k-values may be used as well, which leads to a lower number of the nozzles being used. The number of marking elements which can then be effectively used, for this k-value, is then $n_e$=14. This means that from the printing head having n=15 marking elements, one of the marking elements, e.g. the last marking element will never be used.

The number of marking elements $n_a$ to be used actively during printing passes is, as given by Eq. 5: $n_a = k*I*P = 8$:

The corresponding uniform transport distance TD in nozzle pitch is:

$$TD = \frac{n_a}{P*I} - \frac{1}{I} = \frac{8}{2} - \frac{1}{2} = 3.5$$

The printing head 10 writes during a first printing pass with marking elements 1 to 8 at pixels indicated by "1" in FIG. 2A. After having printed the first printing pass in the fast scan direction Y, the printing head 10 and the printing medium are moved with respect to each other over a transport distance of 3.5 nozzle pitches. The printing head 10 prints during a second printing pass all pixels indicated with "2" in FIG. 2A, again with marking elements 1 to 8. Again, the printing head 10 and the printing medium are moved with respect to each other over a transport distance of 3.5 nozzle pitches. During a third printing pass, the printing head 10 prints all pixels indicated with "3" in FIG. 2A, this time with marking elements 2 to 9. Thereafter, the printing head 10 and the printing medium are moved with respect to each other over a transport distance of 3.5 nozzle pitches. During a fourth printing pass, the printing head 10 prints all pixels indicated with "4" in FIG. 2A, again with marking elements 2 to 9. The sequence of movement of printing head 10 with respect to printing medium, and printing of a printing pass with 8 marking elements is repeated, as illustrated in FIG. 2A–FIG. 2C. Each time, two printing passes are printed with a first set of eight active marking elements, and then the next two printing passes are printed with a second set of eight active marking elements. The second set corresponds to the first set shifted over one marking element. The active marking elements are indicated by "x" in FIGS. 2A–2C, while the non-active marking elements are indicated by "o".

After 14 printing passes, as given by Eq. 8, a transport step is carried out twice without being followed by printing. This means that after printing pass 14 the printing head 10 and the printing medium are moved with respect to each other in the slow scan direction X over a transport distance TD. Thereafter, during what would be printing pass 15, no printing is carried out, and thus the printing head and the printing medium do not need to be moved with respect to each other in the fast scan direction. Again, the printing head and the printing medium are moved with respect to each other in the slow scan direction X over a transport distance TD, and during what would be the subsequent printing pass 16 again no printing is carried out. Thereafter the printing head and the printing medium are moved with respect to each other in the slow scan direction X over the transport distance TD, and during the subsequent printing pass 17, printing is carried out by marking elements 1 to 8. The whole process is then started as from the first printing pass.

Figure 3:
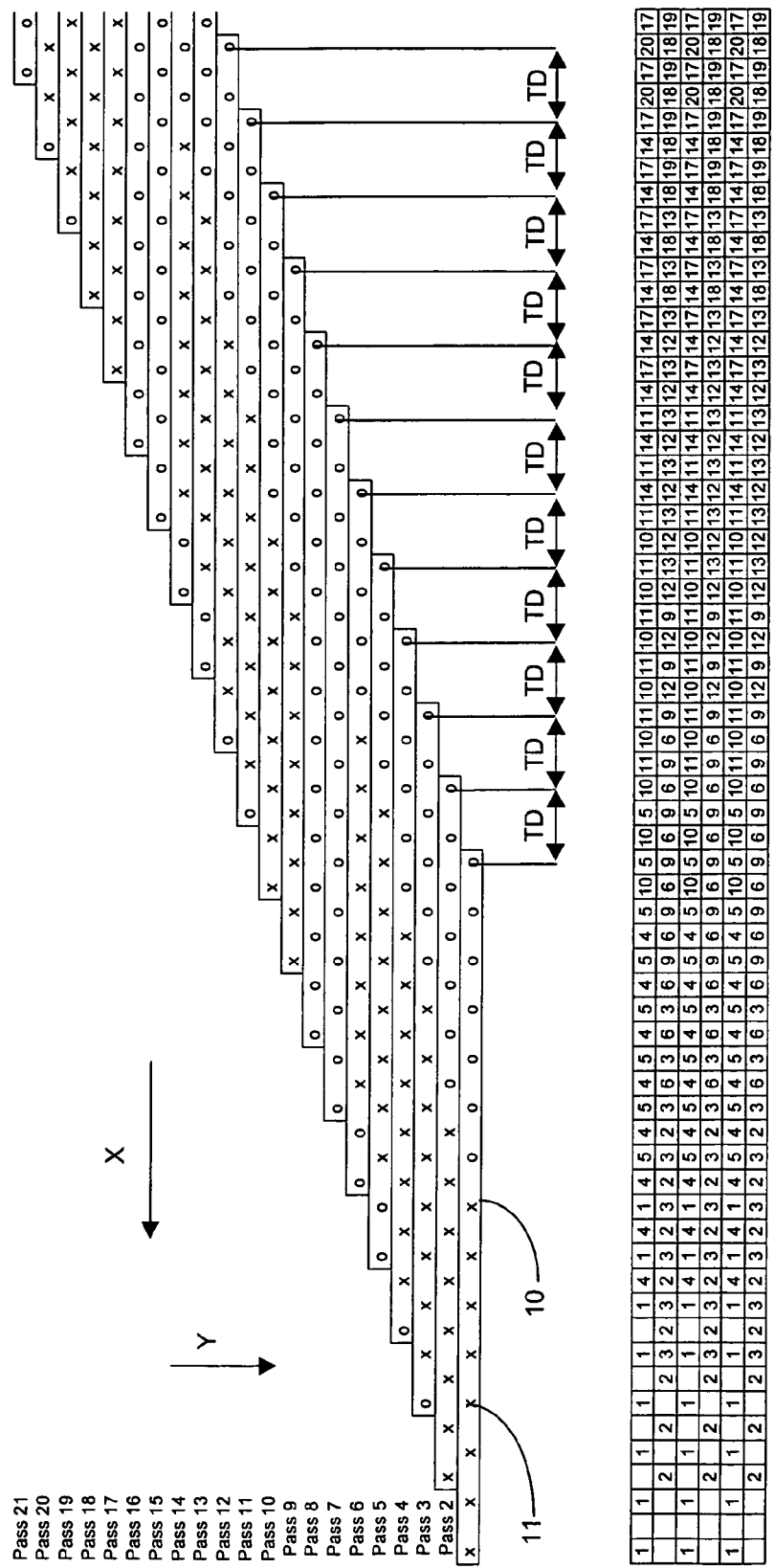
FIG. 3 is an illustration of a second example of interlaced printing according to an embodiment of the present invention.

In the second example illustrating the principles of the present invention, see FIG. 3, a printing head 10 is used which has n=15 marking elements for printing an image on a printing medium. The printing head prints the image in N=I*P sub-images, I=2 being the number of interlacing steps and P=2 being the number of mutually interstitial printing steps, thus N=4.

The number of marking elements of the printing head which can effectively be used according to the present invention is:

$$n_e = k*I*(P+1)-2 = k*6-2$$

k-values which may be used are k=1 or k=2. The example illustrated in FIG. 3 is for k=2, which corresponds to the maximum possible k-value and thus the most efficient, because fastest, way of printing.

The number of marking elements which can then be effectively used, for k=2, is $n_e$=10. This means that from the printing head having n=15 marking elements only 10 marking elements are used, for example the first 10 marking elements, and that the remaining 5 marking elements are not used for printing the image.

The number of marking elements $n_a$ to be used actively during printing passes is $$n_a = k*I*P = 8.$$

The corresponding uniform transport distance TD in nozzle pitch is:

$$TD = \frac{n_a}{P*I} - \frac{1}{I} = \frac{8}{4} - \frac{1}{2} = 1.5$$

The printing head 10 writes during a first printing pass with marking elements 1 to 8 at pixels indicated by "1" in FIG. 3. After having printed the first printing pass in the fast scan direction Y, the printing head 10 and the printing medium are moved with respect to each other over a transport distance of 1.5 nozzle pitch. The printing head 10 prints during a second printing pass all pixels indicated with "2" in FIG. 2A, again with marking elements 1 to 8. Again, the printing head 10 and the printing medium are moved with respect to each other over a transport distance of 1.5 nozzle pitch. During a third printing pass, the printing head 10 prints all pixels indicated with "3" in FIG. 2A, this time with marking elements 2 to 9. Thereafter, the printing head 10 and the printing medium are moved with respect to each other over a transport distance of 1.5 nozzle pitch. During a fourth printing pass, the printing head 10 prints all pixels indicated with "4" in FIG. 3, again with marking elements 2 to 9. The sequence of movement of printing head 10 with respect to printing medium, and printing of a printing pass with 8 marking elements is repeated, as illustrated in FIG. 3. Each time, two printing passes are printed with a first set of eight active marking elements, and then the next two printing passes are printed with a second set of eight active marking elements. The second set corresponds to the first set shifted over one marking element. The active marking elements are indicated by "x" in FIG. 3, while the non-active marking elements are indicated by "o".

After $(n_e-n_a+1)*I=6$ printing passes, a transport step is carried out twice without being followed by printing. This means that after printing pass 6 the printing head 10 and the printing medium are moved with respect to each other in the slow scan direction X over a transport distance TD of 1.5 nozzle pitch. Thereafter, during what would be printing pass 7, no printing is carried out, and thus the printing head and the printing medium do not need to be moved with respect to each other in the fast scan direction. Again, the printing head and the printing medium are moved with respect to each other in the slow scan direction X over a transport distance TD, and during what would be the subsequent printing pass 8 again no printing is carried out. Thereafter the printing head and the printing medium are moved with respect to each other in the slow scan direction X over the transport distance TD, and during the subsequent printing pass 9, printing is carried out by marking elements 1 to 8. The whole process is then started as from the first printing pass.

Figure 4A:
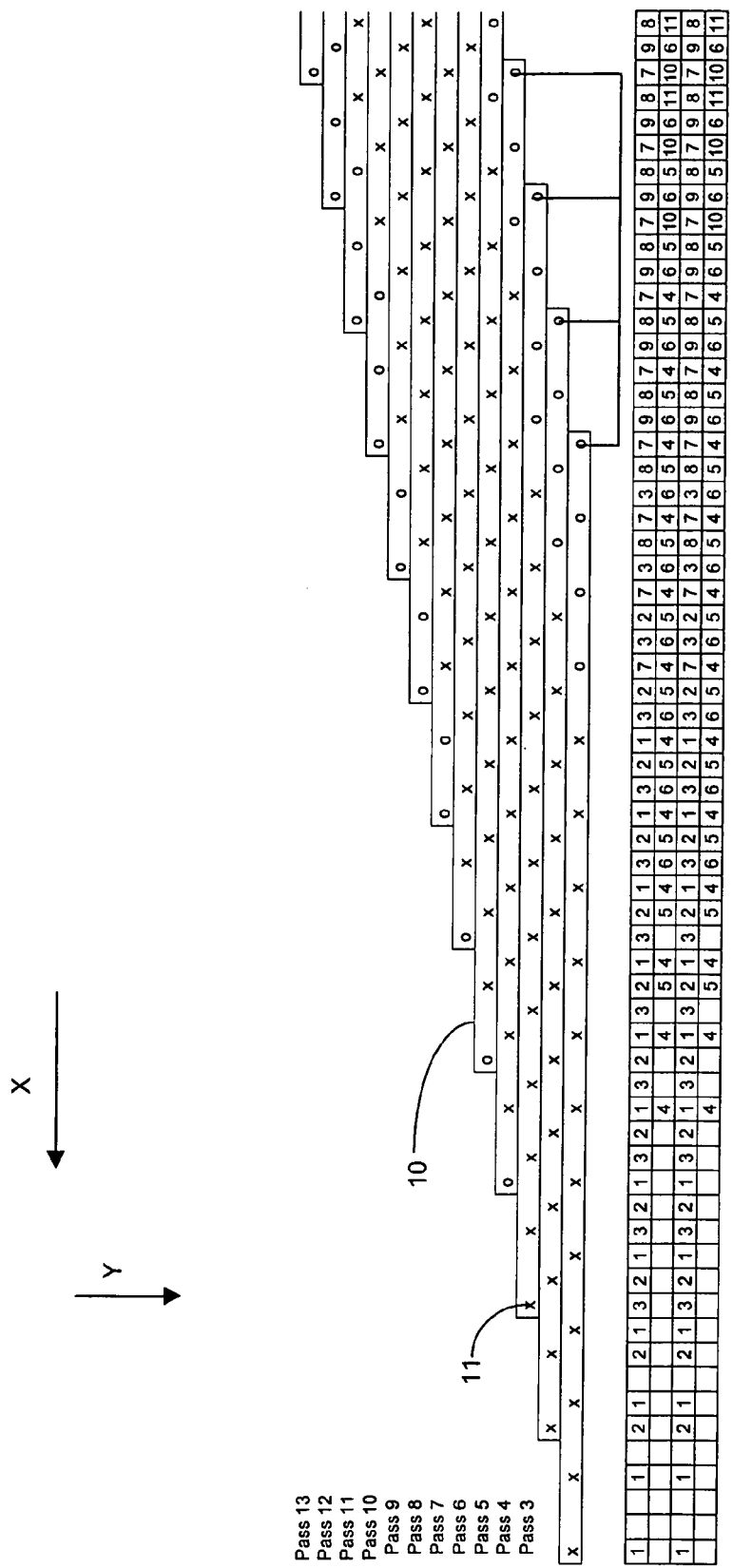
FIG. 4A and FIG. 4B are an illustration of a third example of interlaced printing according to an embodiment of the present invention. These 2 drawings can be placed next to each other and together describe 25 passes of interlaced printing.
Figure 4B:
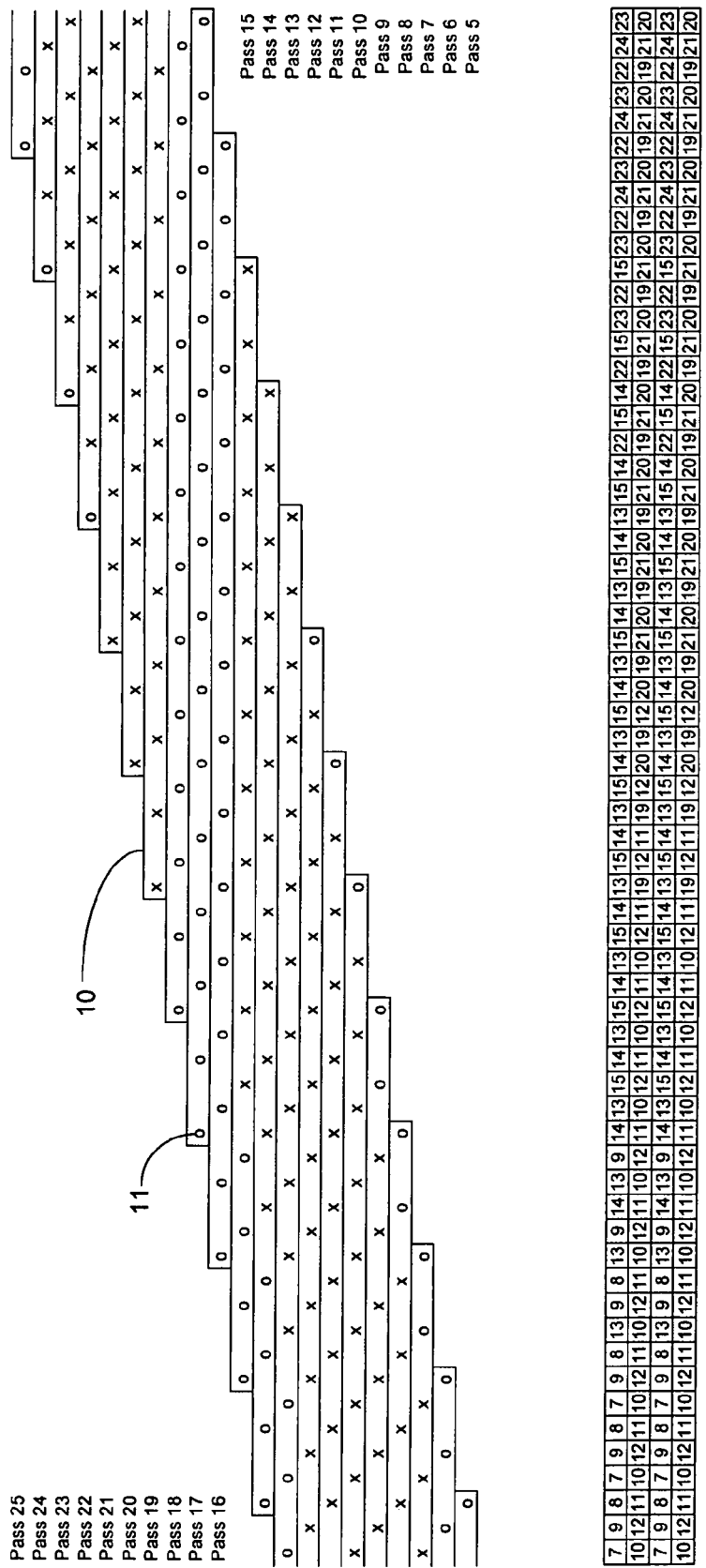

In the third example illustrating the principles of the present invention, see FIG. 4A and FIG. 4B, a printing head is used which has n=16 marking elements for printing an image on a printing medium. The printing head prints the image in N=I*P sub-images, I=3 being the number of interlacing steps and P=2 being the number of mutually interstitial printing steps, thus N=6.

The number of marking elements of the printing head which can effectively be used according to the present invention is:

$$n_e=k*I*(P+1)-2=k*9-2$$

k-values which may be used are k=1 or k=2. The example illustrated in FIGS. 4A and 4B is for k=2. The number of marking elements which can then be effectively used, for k=2, is $n_e$=16. This means that from the printing head having n=16 marking elements, all marking elements are used for printing the image.

The number of marking elements $n_a$ to be used actively during printing passes is $$n_a=k*I*P=12.$$

The corresponding uniform transport distance TD in nozzle pitch is:

$$TD = \frac{n_a}{P*I} - \frac{1}{I} = \frac{12}{6} - \frac{1}{3} = \frac{5}{3}$$

The printing head 10 writes during a first printing pass with marking elements 1 to 12 at pixels indicated by "1" in FIG. 4A. After having printed the first printing pass in the fast scan direction Y, the printing head 10 and the printing medium are moved with respect to each other over a transport distance of 5/3 nozzle pitch. The printing head 10 prints during a second printing pass all pixels indicated with "2" in FIG. 4A, again with marking elements 1 to 12. Again, the printing head 10 and the printing medium are moved with respect to each other over a transport distance of 5/3 nozzle pitch. The printing head 10 prints during a third printing pass all pixels indicated with "3" in FIG. 4A, again with marking elements 1 to 12. Again, the printing head 10 and the printing medium are moved with respect to each other over a transport distance of 5/3 nozzle pitch. During a fourth printing pass, the printing head 10 prints all pixels indicated with "4" in FIG. 4A, this time with marking elements 2 to 13. Thereafter, the printing head 10 and the printing medium are moved with respect to each other over a transport distance of 5/3 nozzle pitch. During a fifth printing pass, the printing head 10 prints all pixels indicated with "5" in FIG. 4A, again with marking elements 2 to 13. Thereafter, the printing head and the printing medium are moved with respect to each other over a transport distance of 5/3 nozzle pitch. During a sixth printing pass, the printing head 10 prints all pixels indicated with "6" in FIG. 4A, again with marking elements 2 to 13.

The sequence of movement of printing head 10 with respect to printing medium, and printing of a printing pass with 12 marking elements is repeated, as illustrated in FIG. 4A and FIG. 4B. Each time, three printing passes are printed with a first set of twelve active marking elements, and then the next three printing passes are printed with a second set of twelve active marking elements. The second set corresponds to the first set shifted over one marking element in the slow scan direction. The active marking elements are indicated by "x" in FIGS. 4A and 4B, while the non-active marking elements are indicated by "o".

After 15 printing passes, a transport step is carried out three times without being followed by printing. This means that after printing pass 15 the printing head 10 and the printing medium are moved with respect to each other in the slow scan direction X over the transport distance TD. Thereafter, during what would be printing pass 16, no printing is carried out, and thus the printing head and the printing medium do not need to be moved with respect to each other in the fast scan direction. Again, the printing head and the printing medium are moved with respect to each other in the slow scan direction X over a transport distance TD, and during what would be the subsequent printing pass 17 again no printing is carried out. This sequence of movement of printing head 10 with respect to printing medium, followed by not printing is repeated up to the moment when the printing head is in the right position to start printing again with the first twelve marking elements. Therefore, the printing head 10 is moved with respect to the printing medium in the slow scan direction, without printing in between, a number of times which equals the number of interlacing steps, which is three in the example given.

Thereafter the printing head and the printing medium are moved with respect to each other in the slow scan direction X over the transport distance TD, and during the subsequent printing pass 19, printing is carried out by marking elements 1 to 12. The whole process then continues as from the first printing pass.

From the above examples, it can be seen that uniform transport distances are always performed, either with printing between two transport distances, or without printing between transport distances. This enhances stability of the printing system.

In the above example, the number of marking elements in a printing head are rather limited, about 15. This, however, is for illustrative purposes only, and is in no way intended to limit the invention. Conventional printing heads for example comprise a number of marking elements n=384, or n=764. The present invention goes equally well for this larger number of marking elements, but it becomes difficult to illustrate in drawings.

As an example, an illustration for a printing head having n=384 marking elements is given hereinafter, without reference to the drawings. The number of marking elements per inch NPI=180. This printing head is used for a print condition with the number of shingling steps P=4 and the number of interlacing steps I=4. Therefore, an image with a resolution DPI=720 can be printed. The image is printed as N=I*P=16 sub-images, and thus 16 printing passes are needed.

For this example, the number of marking elements which can effectively be used according to the present invention is given by:

$$n_e = k*I*(P+1) - 2 = k*20 - 2$$

where k is an integer so that $n_e \leq n$. Therefore, k may have any integer value between 1 and 19. For k=19, $n_e$ equals 378. This means that only 378 of the 384 marking elements can be used for printing according to the present invention.

The number of marking elements $n_a$ to be used actively during printing passes equals $$n_a = k*I*P = 304.$$

The corresponding uniform transport distance TD in nozzle pitch is:

$$TD = \frac{n_a}{P*I} - \frac{1}{I} = \frac{304}{16} - \frac{1}{4} = 18.75$$

During a first printing pass, the 304 first marking elements are used for printing a first sub-image. After the first printing pass, the printing head and the printing medium are moved with respect to each other in the slow scan direction, over a transport distance TD=18.75. This printing and moving sequence is repeated I=4 times. After four printing and moving sequences, a fifth printing pass is done, with marking elements which are shifted over one in the slow scan direction, i.e. with marking elements 2 to 305. After this fifth printing pass, again the printing head and the printing medium are moved with respect to each other in the slow scan direction, over the uniform transport distance TD=18.75. Again, this printing and moving sequence is repeated I=4 times.

Every I=4 printing passes, the $n_a$ actively used marking elements are shifted over one marking element in the slow scan direction.

After $(n_e - n_a + 1)*I = (378-304+1)*4 = 300$ printing passes, four transport steps over the uniform transport distance TD=18.75 are carried out without printing passes in between them.

Thereafter, the $n_a$ actively used marking elements are again shifted to the beginning of the printing head, so as to start printing as in the beginning, with the first $n_a$=304 marking elements.

It is also possible, according to the present invention, to omit the is last step of shifting back to the first $n_a$ actively used marking elements if images are printed with a limited size L. With a limited size L is meant that the image to be printed has a size which is smaller than the total length printed before the printing head has to brought back to its starting position, i.e. to a position in which it starts printing with the first $n_a$ marking elements.

In order to print an image with length L completely, the printing head should be transported over a length $$L + n_a * \frac{(N-1)}{N}. \tag{Eq. 9}$$

As in the previous embodiments, a shift of the $n_a$ actively used marking elements occurs after I transport steps over a transport distance TD. The maximum number of shifts of the actively used marking elements which can occur equals $n - n_a$.

The distance the printing head is moved (in nozzle pitch) before doing a nozzle shift equals I*TD. This distance, multiplied by the number of times a shift of the marking elements can be done, equals the total length which can be printed:

$$(n - n_a)*I*TD = L + n_a * \frac{N-1}{N} \tag{Eq. 10}$$

For a given length L of an image to be printed, and a given number n of marking elements in the printing head 10, the number of nozzles to be actively used and the corresponding transport distance TD are to be calculated.

If Eq. 3 is brought into Eq. 10, then the following is obtained:

$$\left(\frac{n_a}{P} - 1\right)*(n - n_a) = L + n_a * \frac{N-1}{N} \tag{Eq. 11}$$

$$\Rightarrow \frac{n_a}{P}*n - n - \frac{n_a^2}{P} + n_a = L + n_a*\left(1 - \frac{1}{I*P}\right)$$

$$\Rightarrow \frac{n_a^2}{P} + n_a*\left(1 - \frac{1}{I*P}\right) - \frac{n_a}{P}*n + n - n_a + L = 0$$

$$\Rightarrow \frac{n_a^2}{P} + n_a*\left(1 - \frac{1}{I*P} - \frac{n}{P} - 1\right) + L + n = 0$$

$$\Rightarrow I*n_a^2 - (1 + n*I)*n_a + I*P*(L+n) = 0$$

$$\Delta = (1 + n*I)^2 - 4*I^2*P*(L+n)$$

$$\Rightarrow n_a = \frac{(1 + n*I) + \sqrt{(1+n*I)^2 - 4*I^2*P*(L+n)}}{2*I} \tag{Eq. 12}$$

Because it is also possible to print with less nozzles than what the solution Eq. 12 of the above equation Eq. 11 describes, the 'equal to' sign is replaced by a 'not smaller than' sign:

$$n_a \leq \frac{(I*n + 1)}{2*I} + \sqrt{\frac{n^2}{4} + \frac{n}{2*I} + \frac{1}{4*I^2} - P*n - P*X} \tag{Eq. 13}$$

As $n_a$ has to be a multiple of N, the correct formula for $n_a$ becomes:

$$n_a \leq \text{int}\left[\frac{\frac{(I*n+1)}{2*I} + \sqrt{\frac{n^2}{4} + \frac{n}{2*I} + \frac{1}{4*I^2} - P*n - P*L}}{N}\right]*N \tag{Eq. 14}$$

whereby $n_a$ is an integer. The most efficient way of printing, because it is the fastest way of printing, is for $n_a$ being maximum, i.e.

$$n_a = \text{int}\left[\frac{\frac{(I*n+1)}{2*I} + \sqrt{\frac{n^2}{4} + \frac{n}{2*I} + \frac{1}{4*I^2} - P*n - P*L}}{N}\right] *N \quad \text{(Eq. 15)}$$

The corresponding transport distance TD is obtained by introducing Eq. 15 into Eq. 3:

$$TD = \quad \text{(Eq. 16)}$$

$$\text{int}\left[\frac{\frac{(I*n+1)}{2*I} + \sqrt{\frac{n^2}{4} + \frac{n}{2*I} + \frac{1}{4*I^2} - P*n - P*L}}{N}\right] - \frac{1}{I}$$

If $$\frac{n^2}{4} + \frac{n}{2*I} + \frac{1}{4*I^2} - P*n - P*L < 0,$$

it is not possible to calculate the above formulae Eq. 15 and Eq. 16. In fact this means that the size L of the image is not suitable for the image to be printed without shifting back to the first $n_a$ actively used marking elements. This is the case when $$L > \frac{n^2}{4*P} + \frac{n}{2*I*P} + \frac{1}{4*I^2*P} - n \quad \text{(Eq. 17)}$$

or thus the limited size L needs to be equal to or smaller than $$\frac{n^2}{4*P} + \frac{n}{2*I*P} + \frac{1}{4*I^2*P} - n.$$

If the image for example has a length of L, in nozzle pitch, e.g. the image to be printed has a length of 500, and it is to be printed with the printing head as in the fourth example, i.e. with a printing head having 384 marking elements, performing twice interlacing I=2 and twice mutually interstitial printing P=2. In that case, the uniform transport distance TD which may be used is:

$$TD = \text{int}\left[\frac{\frac{(I*384+1)}{2*2} + \sqrt{\frac{384^2}{4} + \frac{384}{2*2} + \frac{1}{4*4} - 2*384 - 2*500}}{4}\right] - \frac{1}{2} = 93.5$$

and the number of marking elements which may be effectively used during one printing pass equals:

$$n_a = \text{int}\left[\frac{\frac{(2*384+1)}{2*2} + \sqrt{\frac{384^2}{4} + \frac{384}{2*2} + \frac{1}{4*4} - 2*384 - 2*500}}{4}\right] *4 = 376$$

This means that the image will be printed by using 376 of the 389 marking elements, and that the transport distance between every two printing passes is 93.5.

After every two printing steps, the actively used marking elements $n_a$ are shifted over one marking element in the slow scan direction. This can be done $(n-n_a)$ times. This means that the printing head can be moved $I*(n-n_a)$ times over the transport distance TD. For the example here described, the printing head can be moved 2*(389−376)=26 times over the transport distance TD=93.5 nozzle pitch.

Comparing both examples where a printing head with 389 marking elements is used, leads to:

1. 304 marking elements are actively used during a printing pass, is any width of image can be printed, and after a number of printing passes a number of idle passes are performed, after which the actively used nozzles are shifted back to the beginning of the printing head; and
2. 376 marking elements are actively used during a printing pass for an image having a width of 500 in nozzle pitch, and no jump back to the beginning of the head needs to be carried out.

Therefore, it is possible, for a given image to be printed, to calculate both solutions and to decide which method is to be taken depending on the number of nozzles that will be actively used. The higher the number of nozzles that will be actively used, the better the performance of the printing device, at least in function of speed of printing. Accordingly, the present invention includes a printing controller or printing control software which can present more than of the above solutions to the user of the printer for selection of an appropriate printing method. Alternatively, the present invention includes a printer controller or printing software which makes the decision automatically in accordance with a criterion, e.g. in accordance with the number of nozzles.

Such optimisation routing lies within the skill of a person skilled in the art, and does not need any further explanation here.

According to a further embodiment of the present invention, in the special case where n=2*P, i.e. the number n of marking elements in the printing head is double of the number P of mutually interstitial printing passes, the number $n_a$ of marking elements used equals the number n of marking elements available. The uniform transport distance equals:

$$TD = \frac{n}{I*P} - \frac{1}{I} \quad \text{(Eq. 18)}$$

After a number of printing passes equal to $I^2*TD$, a number of transport steps over the transport distance TD are carried out without printing passes in between them. This number of "idle" transport steps is equal to I.

In this embodiment, as all n marking elements are used, the shift back of marking elements takes place over zero marking elements. This means that always the same marking elements are used for printing.

Figure 7:
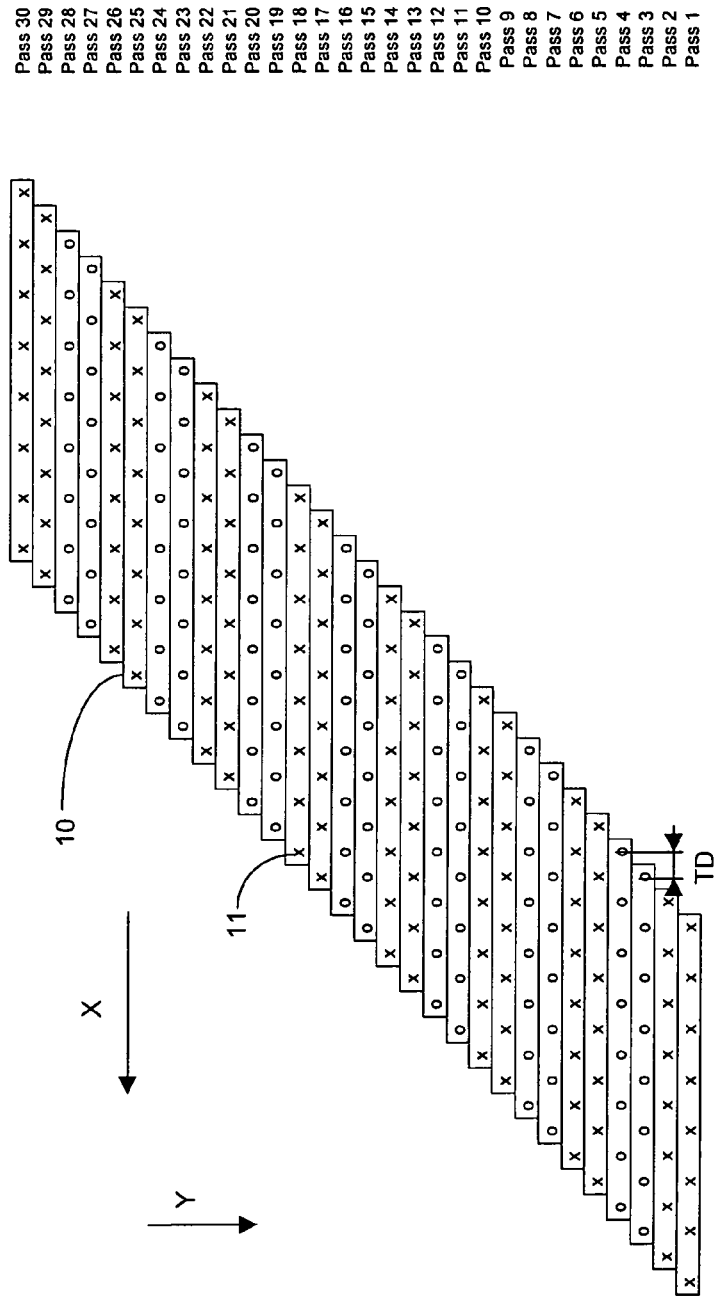
FIG. 7 is an illustration of a fourth example of interlaced printing according to an embodiment of the present invention, for the special case when the number of marking elements in a printing head is the double of the number of mutually interstitial printing passes (n=2*P).

As an example, a printing head 10 having n=8 marking elements 11 is used for printing, on a printing medium, an image with I=2 interlacing steps and P=4 mutually interstitial printing steps. It can be seen that n=2*P, the special case of this embodiment. This example is illustrated in FIG. 7.

The pitch between two marking elements 11, or nozzle pitch, is two dots, thus the number of interlacing steps I=2. According to the present invention, it is possible to print the image with a constant transport distance of the printing medium.

In this special case, all n marking elements are used for printing. This has the advantage that printing can be done as fast as possible.

The uniform transport distance TD, in nozzle pitch is (Eq. 18): TD=0.5.

The printing head 10 writes during a first printing pass with marking elements 1 to n, in the example given with marking elements 1 to 8 at pixels indicated by "1" in FIG. 7. After having printed the first printing pass in the fast scan direction Y, the printing head 10 and the printing medium are moved with respect to each other over a transport distance of 0.5 nozzle pitch. The printing head 10 prints during a second printing pass all pixels indicated with "2" in FIG. 7, again with marking elements 1 to 8.

After these two printing passes, a transport step is carried out twice without being followed by printing. This is illustrated in more detail in FIG. 7. Active marking elements 11, i.e. marking elements which may print during a printing pass, depending on the image to be printed, are illustrated in FIG. 7 by an indication "x", while non-active marking elements are indicated by "o". After printing pass 2 the printing head 10 and the printing medium are moved with respect to each other in the slow scan direction X over a transport distance TD. Thereafter, during what would be printing pass 3, no printing is carried out, and thus the printing head and the printing medium do not need to be moved with respect to each other in the fast scan direction, although they may be driven to do so. Again, the printing head 10 and the printing medium are moved with respect to each other in the slow scan direction X over a transport distance TD, and during what would be printing pass 4 again no printing is carried out.

Thereafter the printing head 10 and the printing medium are moved with respect to each other in the slow scan direction X over the transport distance TD, and during the subsequent printing pass 5, printing is carried out by marking elements 1 to 8, or thus again by all marking elements present in the printing head. The whole process is then started as from the first printing pass.

It is an advantage of the present invention that a simpler and thus cheaper mechanism may be used for driving the movement between a printing head and a printing medium in the slow scan direction. The driving of the movement is more stable, and a better registration between printing medium and printing head can be obtained.

Furthermore, any printing head and any printing scheme according to the present invention can be used, contrary to the prior art solution where a certain relationship between the number of interlacing steps and the number of marking elements is imposed.

Figure 5:
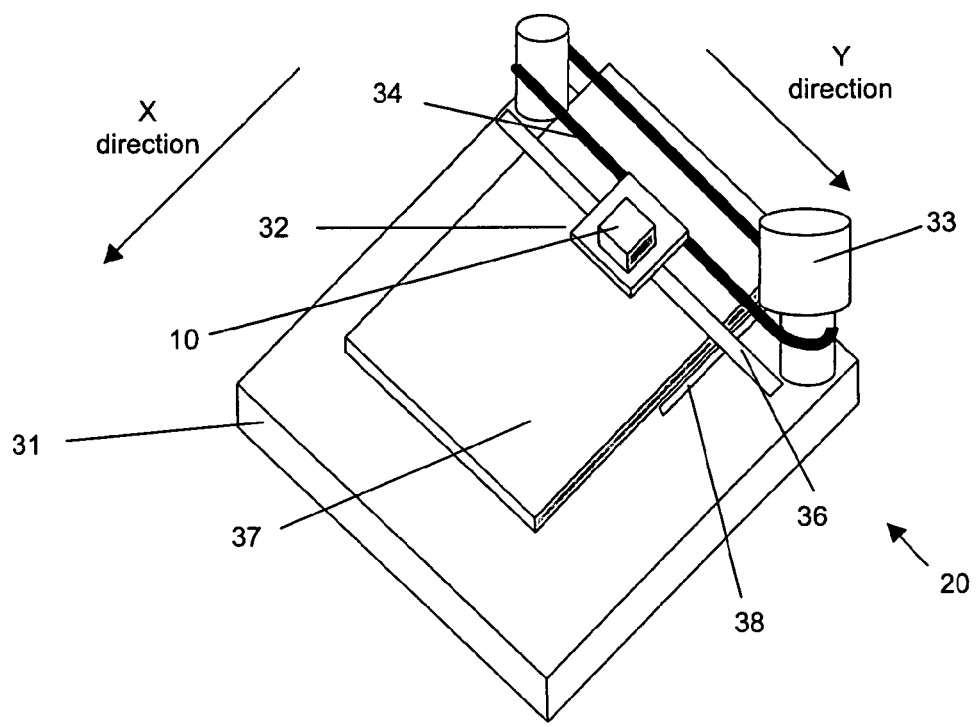
FIG. 5 is a highly schematic representation of an inkjet printer in accordance with an embodiment of the present invention.

FIG. 5 is a highly schematic general perspective view of an inkjet printer 60 which is an embodiment of the present invention. The printer 60 includes a base 31 and a printing head 10 that has a plurality of nozzles or similar marking elements. The printing head may also include an ink cartridge or any suitable ink supply system. A sheet of paper 37 or similar printing medium is fed in the slow scan direction over a support 38 by a feed mechanism (not shown). The carriage assembly 32 is moved along the guide rail assembly 36 by the action of the drive belt 34 driven by the step motor 33 in the fast scan direction.

Figure 6:
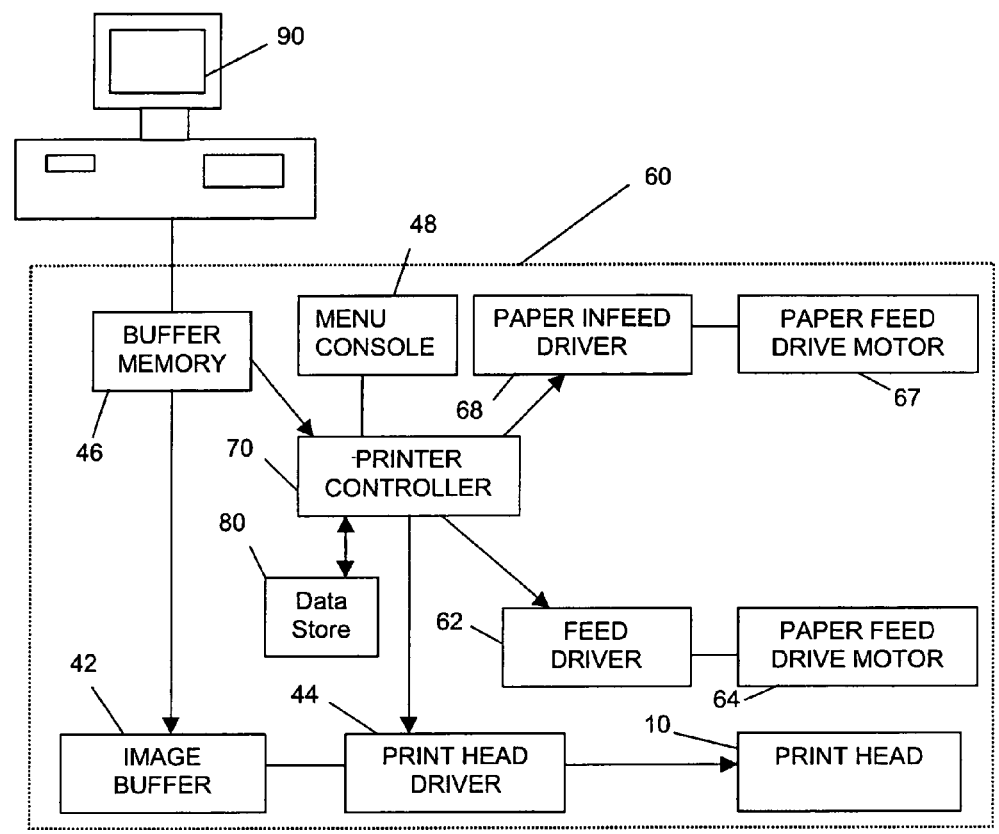
FIG. 6 is a schematic representation of a printer controller in accordance with an embodiment of the present invention.

FIG. 6 is a block diagram of the electronic control system of a printer 60, which is one example of a control system for use with a printing head 10 in accordance with the present invention. The printer 60 includes a buffer memory 46 for receiving a print file in the form of signals from a host computer 90, an image buffer 42 for storing printing data, and a printer controller 70 that controls the overall operation of the printer 60. Connected to the printer controller 70 are a feed driver 62 for a paper feed drive motor 64 for driving the conveying mechanism of the paper, a paper feed driver 68 for controlling a paper feed device for introducing paper to the process flow, and a head driver 44 for the printing head 10. In addition there is a data store 80 for storing parameters for controlling the interlaced and mutual interstitial printing operation. Host computer 90 may be any suitable programmable computing device such as personal computer with a Pentium IV microprocessor supplied by Intel Corp. USA, for instance, with memory and a graphical interface such as Windows 2000 as supplied by Microsoft Corp. USA. The printer controller 70 may include a computing device, e.g. microprocessor, for instance it may be a micro-controller. In particular, it may include a programmable printer controller, for instance a programmable digital logic device such as a Programmable Array Logic (PAL), a Programmable Logic Array, a Programmable Gate Array, especially a Field Programmable Gate Array (FPGA). The use of an FPGA allows subsequent programming of the printer device, e.g. by downloading the required settings of the FPGA.

The user of printer 60 can optionally set values into the data store 80 so as to modify the operation of the printing head 10. The user can for instance set values into the data store 80 by means of a menu console 48 on the printer 60. Alternatively, these parameters may be set into the data store 80 from host computer 90, e.g. by manual entry via a keyboard. For example, based on data specified and entered by the user, a printer driver (not shown) of the host computer 90 determines the various parameters that define the printing operations and transfers these to the printer controller 70 for writing into the data store 80. One aspect of the present invention is that the printer controller 70 controls the operation of printing head 10 in accordance with settable parameters stored in data store 80. Based on these parameters, the printer controller 70 reads the required information contained in the printing data stored in the buffer memory 46 and sends control signals to the drivers 44 and 62, and 68. In particular controller 70 is adapted for a dot matrix printer for printing an image on a printing medium, the control unit comprising software or hardware means for controlling printing of the image as at least one set of monochromatic interlaced printed sub-images, and software or hardware means for controlling the marking elements and a sequence in which the printing of the sub-images is carried out, i.e. the sequences of printing passes to complete the printing of the image. At each pass a sub-image of the total image is printed. The controller may be used for setting the number of sub-images (i.e. passes) as well as to control the paper feed drive and the input and output devices for printing media. The controller is also adapted to control the operation of the printing head 10 so that each pass of the printing head 10 is a mutually interstitial printing step or an interlacing step. As explained above the printing head has an array of marking elements under the control of the controller. The controller is also adapted to control the movement of the printing head 10 in the Y-direction relative to the printing medium moving in the X-direction for successively writing a plurality of contiguous swaths of each of a $1^{st}$ to $N^{th}$ sub-image, the printing medium being transported relative to the printing head 10 between printing passes over a distance in the X-direction which is equal to the uniform transport distance $$T_d = \frac{n_a}{P*I} - \frac{1}{I}.$$

For instance, the printing data is broken down into the individual colour components to obtain image data in the form of a bit map for each colour component which is stored in the receive buffer memory 46. The sub-images are derived from this bit map, in particular each sub-image will start at a certain offset within the bit map. In accordance with control signals from the printer controller 70, the head driver 44 reads out the colour component image data from the image buffer memory 42 in accordance with a specified sequence of printing the sub-images and uses the data to drive the array(s) of marking elements on the printing head 10 to interlaced print the sub-images on different passes. The data which is stored in data store 80 may comprise:

1. the number of passes which will make up the interstitial printing operation,
2. which marking elements are active at each printing pass operation,
3. the offset in the bit map to be printed for each such pass.

The present invention includes the storing of alternative representations of this data which however amount to the same technique of printing. In each case 1) to 3) there can be a default value which is assumed to apply if the user does not enter any values. It will be appreciated from the above that the user may freely set the number of sub-images to be printed by selecting the number of passes.

The present invention also includes that items 1) to 3) above are machine settable, for instance printer controller 70 sets the parameters for printing, e.g. at least one of items 1) to 3) above, e.g. in accordance with an optimised algorithm. As indicated above the controller 70 may be programmable, e.g. it may include a microprocessor or an FPGA. In accordance with embodiments of the present invention a printer in accordance with the present invention may be programmed. For example, the printer may provide selection of the number of the sub-images. Accordingly, the present invention includes a computer program product which provides the functionality of any of the methods according to the present invention when executed on a computing device. Further, the present invention includes a data carrier such as a CD-ROM or a diskette which stores the computer product in a machine readable form and which executes at least one of the methods of the invention when the program stored on the data carrier is executed on a computing device. Nowadays, such software is often offered on the Internet or a company Intranet for download, hence the present invention includes transmitting the printing computer product according to the present invention over a local or wide area network. The computing device may include a personal computer or a work station. The computing device may include one of a microprocessor and an FPGA.

The data store 80 may comprise any suitable device for storing digital data as known to the skilled person, e.g. a register or set of registers, a memory device such as RAM, EPROM or solid state memory.

While the invention has been shown and described with reference to preferred embodiments, it will be understood by those skilled in the art that various changes or modifications in form and detail may be made without departing from the scope and spirit of this invention. For instance, with reference to FIG. 6 the parameters for determining the interlaced printing are stored in data store 80. However, in accordance with the present invention the preparation for the printing file to carry out the above mentioned printed embodiments may be prepared by the host computer 90 and the printer 60 simply prints in accordance with this file as a slave device of the host computer 90. Hence, the present invention includes that the printing schemes of the present invention are implemented in software on a host computer and printed on a printer which carries out the instructions from the host computer without amendment. Accordingly, the present invention includes a computer program product which provides the functionality of any of the methods according to the present invention when executed on a computing device which is associated with a printing head, that is the programmable computing device may be included with the printer or the programmable computing device may be a computer or computer system, e.g. a Local Area Network connected to a printer. The printer may be a network printer.

What is claimed is:

1. A dot matrix printing method for printing an image on a printing medium by means of a printing head comprising a first number n of marking elements, the method comprising printing the image as a set of N sub-images, N being a number C of colours used for printing multiplied by a number I of interlacing steps and multiplied by a number P of mutually interstitial printing steps (N=C*I*P), where the number I of interlacing steps is greater than 1, each interlacing step generating an interlaced sub-image, a swath of an interlaced sub-image being printed during a printing pass, there being at least one linear relative movement between the printing medium and the printing head over a uniform transport distance TD in a slow scan direction between the printing of two subsequently printed swaths of interlaced sub-images, the transport distance TD being uniform for all linear relative movements, wherein printing is carried out with a subset of the n marking elements, the subset of marking elements being changed after I printing passes.

2. Method according to claim 1, the first number n of marking elements being arranged in an array, the subset of marking elements comprising a second number $n_a$ of successive marking elements, $n_a$ being less than n, the changing of the subset of marking elements being obtained by shifting the second number $n_a$ of marking elements in the array with one marking element.

3. Method according to claim 2, wherein the second number $n_a$ of marking elements is a function of the number I of interlacing steps and the number P of mutually interstitial printing steps.

4. Method according to claim 2, wherein the uniform transport distance TD is given by:

$$TD = \frac{n_a}{P*I} - \frac{1}{I},$$

where I is the number of interlacing steps, P is the number of mutually interstitial printing steps, and $n_a$ is the second number of marking elements.

5. Method according to claim 2, furthermore comprising shifting back the subset of marking elements with (I*TD−1) marking elements after (I*TD+1)*I transport steps.

6. A computer readable data storage device for storing the program a program for executing the method as claimed in claim 1 when executed on a computing device associated with a printing head.

7. An apparatus for dot matrix printing of an image on a printing medium as a set of N sub-images, N being a number C of colours used for printing multiplied by a number I of interlacing steps and multiplied by a number P of mutually interstitial printing steps (N=C*I*P), where the number I of interlacing steps is greater than 1, each interlacing step generating an interlaced sub-image, a swath of an interlaced sub-image being printed during a printing pass, the apparatus comprising:
- a printing head having an array of a first number n of equally spaced marking elements, the marking elements being spaced apart by a distance x in a slow scan direction,
- a printing medium transportation device for generating at least one linear relative movement between the printing head and the printing medium over a uniform transport distance TD in the slow scan direction, the transport distance TD being uniform for all linear relative movements,
- a printing head driver for driving a subset of the first number n of marking elements, and
- a printer controller for changing the subset of marking elements after I printing passes.

8. An apparatus according to claim 7, the subset of marking elements comprising a second number $n_a$ of successive marking elements, $n_a$ being less than n, wherein the means for changing the subset of marking elements comprises means for shifting the second number $n_a$ of marking elements with one marking element.

9. An apparatus according to claim 8, furthermore comprising means for shifting back the subset of marking elements over (I*TD−1) marking elements after (I*TD+1)*I transport steps.

10. An apparatus according to claim 7, wherein the marking elements are ink jet nozzles.

11. A control unit for a dot matrix printer for printing an image on a printing medium by means of a printing head comprising a set of marking elements, the control unit comprising:
- a printer controller for controlling printing of the image as a set of N sub-images, N being a number of colours used for printing multiplied by a number I of interlacing steps and multiplied by a number P of mutually interstitial printing steps (N=C*I*P), where the number I of interlacing steps is greater than 1,
- a printing medium transport driver for controlling a linear relative movement between the printing head and the printing medium over a transport distance in a slow scan direction so that the transport distance is uniform for all linear relative movements,
- the printer controller further selecting of a subset of marking elements for printing a number of interlaced sub-images and changing the selected subset after printing of I interlaced sub-images.

* * * * *